United States Patent
Takahashi et al.

(10) Patent No.: US 10,780,719 B2
(45) Date of Patent: *Sep. 22, 2020

(54) INKJET PRINTING DEVICE AND INKJET PRINTING METHOD

(71) Applicant: Ricoh Company, Ltd., Tokyo (JP)

(72) Inventors: Hiroaki Takahashi, Kanagawa (JP); Kiminori Masuda, Tokyo (JP); Mio Akima, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/412,481

(22) Filed: May 15, 2019

(65) Prior Publication Data
US 2019/0381810 A1    Dec. 19, 2019

(30) Foreign Application Priority Data

Jun. 15, 2018 (JP) ................... 2018-114307
Mar. 4, 2019 (JP) ................... 2019-038317

(51) Int. Cl.
*B41J 11/00* (2006.01)
*B41M 7/00* (2006.01)

(52) U.S. Cl.
CPC ............ *B41J 11/002* (2013.01); *B41M 7/009* (2013.01)

(58) Field of Classification Search
CPC ...... B41J 11/002; B41J 2/2114; B41M 7/009; B41M 5/0011; C09D 11/36; C09D 11/10
USPC ......................................................... 347/102
See application file for complete search history.

(56) References Cited

U.S. PATENT DOCUMENTS

| | | | |
|---|---|---|---|
| 2004/0169710 A1* | 9/2004 | Ide | B41J 2/2114 347/101 |
| 2010/0302337 A1* | 12/2010 | Zhou | G03G 15/2014 347/200 |
| 2013/0342621 A1* | 12/2013 | Webster-Curley | B41M 7/0081 347/102 |

(Continued)

FOREIGN PATENT DOCUMENTS

| | | |
|---|---|---|
| JP | 2004-261976 | 9/2004 |
| JP | 2012-232529 | 11/2012 |
| JP | 2015-003397 | 1/2015 |

*Primary Examiner* — Huan H Tran
*Assistant Examiner* — Alexander D Shenderov
(74) *Attorney, Agent, or Firm* — Oblon, McClelland, Maier & Neustadt, L.L.P.

(57) ABSTRACT

An inkjet printing device includes an ink container accommodating a non-aqueous clear ink containing a resin and an organic solvent, a discharging head to discharge the non-aqueous clear ink directly or indirectly onto a substrate to form printed matter; and a heating device to heat the substrate, wherein the following relationship is satisfied: Tlow (° C.)>Thigh (° C.), where Tlow represents the temperature of the substrate that the heating device is heating during printing in a low gloss printing mode in which the non-aqueous clear ink is directly or indirectly discharged and attached to the substrate to impart low gloss to the printed matter and Thigh represents the temperature of the substrate that the heating device is heating during printing in a high gloss printing mode in which the non-aqueous clear ink is directly or indirectly discharged and attached to the substrate to impart high gloss to the printed matter.

13 Claims, 2 Drawing Sheets

(56) References Cited

U.S. PATENT DOCUMENTS

2014/0055511 A1* 2/2014 Smith ................. B41J 2/17593
 347/9
2019/0381811 A1* 12/2019 Masuda ............... B41M 5/0011

* cited by examiner

ововAccording to its context

INKJET PRINTING DEVICE AND INKJET PRINTING METHOD

CROSS-REFERENCE TO RELATED APPLICATIONS

This patent application is based on and claims priority pursuant to 35 U.S.C. § 119 to Japanese Patent Application Nos. 2018-114307 and 2019-038317, filed on Jun. 15, 2018 and Mar. 4, 2019, respectively, in the Japan Patent Office, the entire disclosures of which are hereby incorporated by reference herein.

BACKGROUND

Technical Field

The present invention relates to an inkjet printing device and an inkjet printing method.

Description of the Related Art

For industrial use in advertisement and signboards and packaging material for food, beverage, and daily use articles, etc., for example, non-permeable recording media such as plastic film are used in order to enhance durability for light, water, abrasion, etc. Naturally, inks for such non-permeable recording media have been developed.

As such inks, for example, a solvent-based ink using an organic solvent as a solvent and an ultraviolet-curable ink mainly constituted of a polymerizable monomer have been widely used. However, the solvent-based ink causes a concern about an adverse impact on the environment due to evaporation of the organic solvent. The ultraviolet curable ink has a limited choice of polymerizable monomers in terms of safety in some cases.

For this reason, an ink set including an aqueous ink capable of directly recording on a non-permeable recording medium has been proposed.

Also, an inkjet recording device having a feature capable of controlling gloss has been developed.

For example, a liquid jetting device has been proposed which includes a liquid jetting head capable of jetting an ink containing thermoplastic resin particles from a nozzle to a target and a heating device to heat ink droplets landed on the target, wherein the heating device heats the ink droplets at the filming control temperature according to the minimal film-forming temperature below which the surface of the ink droplets is not filmed to control the degree of the filming of the surface of the ink droplets.

SUMMARY

According to embodiments of the present disclosure, provided is an inkjet printing device which includes an ink container configured to accommodate a non-aqueous clear ink comprising a resin and an organic solvent, a discharging head configured to discharge the non-aqueous clear ink directly or indirectly onto a substrate to form printed matter; and a heating device configured to heat the substrate, wherein the following relationship is satisfied: Tlow (° C.)>Thigh (° C.), where Tlow (° C.) represents the temperature of the substrate that the heating device is heating during printing in a low gloss printing mode in which the non-aqueous clear ink is directly or indirectly discharged and attached to the substrate to impart low gloss to the printed matter and Thigh (° C.) represents the temperature of the substrate that the heating device is heating during printing in a high gloss printing mode in which the non-aqueous clear ink is directly or indirectly discharged and attached to the substrate to impart high gloss to the printed matter.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

A solvent-based ink using an organic solution as a solvent and an ultraviolet-curable ink mainly constituted of a polymerizable monomer have been widely used. However, the solvent-based ink causes a concern about an adverse impact on the environment due to evaporation of the organic solvent. The ultraviolet curing ink has a limited choice of polymerizable monomers in terms of safety in some cases.

For this reason, ink sets including aqueous ink capable of direct recording on non-permeable recording media have been proposed.

Also, an inkjet recording device having a feature capable of controlling gloss has been developed.

For example, a liquid jetting device has been proposed which includes a liquid jetting head capable of jetting an ink containing thermoplastic resin particles from a nozzle to a target and a heating device to heat ink droplets landed on the target, wherein the heating device heats the ink droplets at the filming control temperature according to the minimal film-forming temperature below which the surface of the ink droplets is not filmed to control the degree of the filming of the surface of the ink droplets.

According to the present disclosure, an inkjet printing device is provided which can control both low gloss printing and high gloss printing.

Inkjet Printing Device and Inkjet Printing Method

The inkjet printing device for directly or indirectly printing on a substrate of the present disclosure includes an ink container accommodating a non-aqueous clear ink containing a resin and an organic solvent, a discharging head configured to discharge the non-aqueous clear ink directly or indirectly onto a substrate to form printed matter, and a heating device configured to heat the printed matter, wherein the following relationship is satisfied: Tlow (° C.)>Thigh (° C.), where Tlow (° C.) represents the temperature of the substrate that the heating device is heating during printing in a low gloss printing mode in which the non-aqueous clear ink is directly or indirectly discharged and attached to the substrate to impart low gloss to the printed matter and Thigh (° C.) represents the temperature of the substrate that the heating device is heating during printing in a high gloss printing mode in which the non-aqueous clear ink is directly or indirectly discharged and attached to the substrate to impart high gloss to the printed matter. The inkjet printing device of the present disclosure may further include an optional device.

The inkjet printing device for directly or indirectly printing on a substrate of the present disclosure includes an ink container accommodating a non-aqueous clear ink containing a resin and an organic solvent, a discharging head configured to discharge the non-aqueous clear ink directly or indirectly onto a substrate to form printed matter, and a heating device configured to heat the printed matter, wherein the following relationship is satisfied: HTlow (° C.)>HThigh (° C.), where HTlow (° C.) represents the temperature of the heating device during printing in a low gloss printing to impart low gloss to the printed matter and HThigh (° C.) represents the temperature of the heating device during printing in a high gloss printing mode to impart high gloss to the printed matter. The inkjet printing device of the present disclosure may further include an optional device.

The inkjet printing method of the present disclosure includes discharging a non-aqueous clear ink containing a resin and an organic solvent directly or indirectly to a substrate to form printed matter having a printing layer on the substrate and heating the printed matter, wherein the following relationship is satisfied: Tlow (° C.)>Thigh (° C.), where Tlow (° C.) represents the temperature of the substrate that the heating device is heating during printing in a low gloss printing mode in which the non-aqueous clear ink is directly or indirectly discharged and attached to the substrate to impart low gloss to the printed matter and Thigh (° C.) represents the temperature of the substrate that the heating device is heating during printing in a high gloss printing mode in which the non-aqueous clear ink is directly or indirectly discharged and attached to the substrate to impart high gloss to the printed matter. The inkjet printing method may furthermore optionally other processes.

The inkjet printing method of the present disclosure includes discharging a non-aqueous clear ink containing a resin and an organic solvent directly or indirectly onto a substrate to form printed matter and heating the printed matter, wherein the following relationship is satisfied: HTlow (° C.)>HThigh (° C.), where HTlow (° C.) represents the temperature of the heating device during printing in a low gloss printing mode to impart low gloss to the printed matter. is attached to impart low gloss to the printed matter and HThigh (° C.) represents the temperature of the heating device during printing in a high gloss printing mode to impart high gloss to the printed matter. The inkjet printing method may furthermore optionally other processes.

For a typical inkjet recording device using a clear ink (UV clear ink) that cures upon an application of ultraviolet rays, a high gloss control method has been proposed which controls the irradiation amount of ultraviolet rays to select low gloss or high gloss printing.

However, UV clear ink has a problem of having a strong odor. Since the odor remains in the printed matter, it is unsuitable for the printed matter for indoor use. For this reason, the place of installation of the inkjet printing device also requires an environment capable of exhausting air, which limits the selection of the place of installation. In addition, the UV clear ink requires an ultraviolet ray irradiation device, which increases the size of the device and the cost.

The inkjet printing device and the inkjet printing method of the present disclosure are based on the knowledge that although, in a typical technology disclosed in JP-2015-3397-A, the degree of filming of the surface of droplets of color ink containing a coloring material is controlled by heating at film-forming control temperatures according to the minimal film-forming temperature at which film formation of the ink droplet starts in order to control the degree of high gloss, the color ink containing a coloring material does not make a large high gloss difference in comparison with a clear ink containing no coloring material, which makes it impossible to clearly distinguish low gloss printing from high gloss printing.

The inkjet printing device and the inkjet printing method of the present disclosure use a non-aqueous clear ink containing a resin and an organic solvent, and control both high gloss printing and low gloss printing by the control of the heating temperature. To impart low gloss to printed matter, the temperature at printing is higher than that in high gloss printing. Since the temperature at the time of printing is high, the wet-spreading of dots of a non-aqueous clear ink containing a resin is reduced, the coalescence of adjacent dots is also reduced, and dots having dot balls having a high height (pile height) are formed. These dots form surface irregularities and impart low gloss.

To impart high gloss, printing is conducted at a temperature lower than that in the low gloss mode. Since the temperature at the time of printing is low, dots of a non-aqueous clear ink containing a resin wet-spread and coalescence of adjacent dots is also promoted, so that smooth surfaces are formed, thereby imparting high gloss.

Therefore, the inkjet printing device of the present disclosure has low gloss printing mode to impart low gloss and high gloss printing mode to impart high gloss using a non-aqueous clear ink containing a resin and an organic solvent and is capable of controlling both low gloss printing and high gloss printing when the following relationship is satisfied: Tlow (° C.)>Thigh (° C.), where Tlow (° C.) represents the temperature of the substrate that the heating device is heating during printing in a low gloss printing mode in which the non-aqueous clear ink is directly or indirectly discharged and attached to the substrate to impart low gloss to the printed matter and Thigh (° C.) represents the temperature of the substrate that the heating device is heating during printing in a high gloss printing mode in which the non-aqueous clear ink is directly or indirectly discharged and attached to the substrate to impart high gloss to the printed matter or when the following relationship is satisfied: HTlow (° C.)>HThigh (° C.), where HTlow (° C.) represents the temperature of the heating device during printing in a low gloss printing mode to impart low gloss to the printed matter and HThigh (° C.) represents the temperature of the heating device in a high gloss during printing in a high gloss printing mode to impart high gloss to the printed matter.

The heating device of the inkjet printing device of the present disclosure heats the substrate while satisfying the following relationship: Tlow (° C.)>Thigh (° C.), preferably Tlow (° C.)−Thigh (° C.)≥10° C., and more preferably Tlow (° C.)−Thigh (° C.)≥20° C. Also, when the temperature of the heating device in the low gloss printing mode is HTlow (° C.) and the temperature of the heating device in the high gloss printing mode is HThigh (° C.), the following relationship is satisfied: HTlow (° C.)>HThigh (° C.), preferably HTlow (° C.)−HThigh (° C.)≥10° C., and more preferably HTlow (° C.)−HThigh (° C.)≥20° C.

Therefore, in the low gloss printing mode, the heating temperature is raised to reduce wet-spreading of dots, thereby forming dots having a high pile height to form a surface having large roughness. In the high gloss printing mode, the heating temperature is lowered to promote the wet-spreading of dots, which promotes coalescence of adjacent dots, resulting in formation of a smooth surface.

There is no specific limitation to the temperature HT (° C.) of the heating device and can be suitably selected to suit to a particular application. For example, the preset temperature of the heating device can be used as the temperature HT (° C.) of the heating device.

The temperature Tlow (° C.) of the substrate in a printing portion in the low gloss printing mode is preferably 50 degrees C. or more and more preferably from 50 to 80 degrees C.

The temperature Thigh (° C.) of the substrate in a printing portion in the high gloss printing mode is preferably 70 degrees C. or less and more preferably 60 degrees C. or less.

The temperature HTlow (° C.) of the heating device in the low gloss printing mode is preferably 50 degrees C. or more and more preferably from 50 to 80 degrees C.

The temperature HThigh (° C.) of the heating device in the high gloss printing mode is preferably 70 degrees C. or less and more preferably from 60 degrees C. or less.

Within this temperature range, a large change in glossiness can be demonstrated in each printing mode using the non-aqueous clear ink.

The temperature of the substrate of the printing portion is measured by, for example, a method of directly measuring the recording medium by a thermocouple mounted onto the recording medium as the substrate, a method of measuring the temperature of the heater that heats the recording medium, and a method of measuring the ambient temperature of the recording medium in a non-contact manner by a radiation thermometer, etc., to determine the ambient temperature as the temperature of the recording medium.

In the present disclosure, when the printing ratio of a low gloss print image printed in the low gloss printing mode is Dlow and the printing ratio of a high gloss print image printed in the high gloss printing mode is Dhigh, the following relationship is preferably satisfied: Dhig>Dlow and more preferably Dhigh−Dlow>10 percent.

Since a smooth surface is easily formed when the printing ratio is high, an image having a high printing ratio is obtained in the high gloss printing mode. In the low gloss high gloss printing mode, when the printing ratio is high, adjacent dots are coalesced, thereby making it difficult to obtain surface roughness. Therefore, the printing ratio is low in the low gloss printing mode.

The printing ratio means the following:

Print ratio (percent)=number of clear ink print dots/(vertical resolution×horizontal resolution)×100

In the above formula, "the number of clear ink printing dots" means the number of dots actually printed with clear ink per unit area, and "vertical resolution" and "horizontal resolution" are represented in resolutions per unit area. When clear ink is disposed at the same dot position in an overlapping manner for printing, "the number of clear ink printing dots" represents the total number of dots per unit area actually used for printing with clear ink.

The printing ratio 100 percent means the maximum ink weight of a single color with respect to a pixel.

The present disclosure includes a configuration in which the clear ink is directly applied onto the substrate. It also includes a configuration in which a coating layer is applied onto the substrate and the clear ink is thereafter applied to the substrate or the coating layer, and a configuration in which a processing fluid is and/or a color ink containing a coloring material is applied onto the substrate and thereafter the clear ink is applied onto the substrate, the processing layer, or the color ink layer, meaning that the clear ink is indirectly applied onto the substrate.

Ink Container

The ink container stores ink.

The ink container is not particularly limited as long as it is a member capable of accommodating ink. For example, it includes an ink storage container and an ink tank.

The ink container accommodates the ink and includes other optional suitably-selected members.

There is no specific limit to the ink container. It is possible to select any form, any structure, any size, and any material. For example, a container having at least an ink bag formed of aluminum laminate film, a resin film, etc. can be suitably used.

Examples of the ink tank include a main tank and a sub tank.

Discharging Head

The discharging head discharges ink to form a printing layer on the substrate mentioned above where the ink is attached.

The discharging head includes a nozzle plate, pressurizing chambers, and a stimulus generating device.

Nozzle Plate

The nozzle plate includes a nozzle substrate and an ink repellent film on the nozzle substrate.

Pressure Chamber

Each of the pressurizing chambers, which is individually disposed corresponding to a nozzle orifice provided to the nozzle plate is an individual flow path communicating with the nozzle orifice. The pressurizing chamber is also referred to as an ink flow path, a pressurizing liquid chamber, a pressure chamber, a discharging chamber, a liquid chamber, etc.

Stimulus Generating Device

The stimulus generating device generates a stimulus to be applied to the ink.

The stimulus generated by the stimulus generating device has no specific limit and can be suitably selected to a particular application. For example, heat (temperature), pressure, vibration, and light can be suitably used as the stimulus. These can be used alone or in combination. Of these, heat and pressure are preferable.

The stimulus generating device includes, for example, a heater, a pressurizing device, a piezoelectric element, a vibrator, an ultrasonic oscillator, and light.

Specific examples include, but are not limited to, a piezoelectric actuator such as the piezoelectric element, a thermal actuator that utilizes a phase change caused by film boiling of ink using an electric heat conversion element such as a heat generating resistance, a shape-memory alloy actuator that uses the metal phase change due to temperature change, and an electrostatic actuator that utilizes an electrostatic force.

When the stimulus is "heat", thermal energy corresponding to a recording signal is applied to the ink in the ink discharging head using, for example, a thermal head. For example, a method can be utilized which generates bubbles in the ink by the heat energy and discharges the ink as liquid droplets from the nozzle orifice of the nozzle plate by the pressure of the bubbles.

When the stimulus is "pressure", for example, the piezoelectric element is bent by applying a voltage to the piezoelectric element bonded at a position called the pressure chamber in the ink flow path in the ink discharging head. As a result, the volume of the pressure chamber is contracted, and the ink may be discharged as droplets from the nozzle orifice of the ink discharging head.

Of these, a piezo method discharging an ink by applying a voltage to a piezoelectric element to jet the ink is preferable.

Heating Device

The heating device heats the substrate.

The heating device heats and dries the printing surface and the back surface of the recording medium as the substrate. Examples of the heating device includes an infrared heater, a hot air heater, and a heating roller. These can be used alone or in combination.

The method of drying the recording medium as the substrate is not particularly limited and can be suitably selected to suit to a particular application. Examples of the method include, but are not limited to, a method of drying the recording medium to which the ink is applied by bringing a heated fluid such as warm air as a drying device into contact with the recording medium, a method of transferring heat from a heating member to an ink applied recording medium by contact, and a method of heating the recording medium to which the ink is applied with energy rays such as infrared rays or far infrared rays.

The heating can be conducted before, during, and/or after printing.

Heating before and/or in the middle of printing makes it possible to print on a heated medium and the printed matter can be dried by heating after printing.

The heating time is not particularly limited as long as the surface temperature of the recording medium can be controlled to a desired temperature and can be suitably selected to suit to a particular application.

The heating time is preferably controlled by the control of the conveying speed of the recording medium as the substrate.

Ink

Non-aqueous clear ink is used as the ink.

The clear ink means a colorless and transparent ink substantially free of a coloring material.

The non-aqueous clear ink means a clear ink containing an organic solvent as a solvent and substantially does not contain water.

The non-aqueous clear ink includes an organic solvent and a resin and preferably a surfactant and other optional components.

Resin

The resin has no particular limit and can be suitably selected to suit to a particular application.

Specific examples include, but are not limited to, polyurethane resins, polyester resins, acrylic resins, vinyl acetate resins, styrene resins, butadiene resins, styrene-butadiene resins, vinylchloride resins, acrylic styrene resins, and acrylic silicone resins.

When producing the ink, it is preferable to add the resin as resin particles composed of these resins. The resin particle may be added to the ink in a form of a resin emulsion in which the resin is dispersed in water as a dispersion medium. It is possible to use suitably-synthesized resin particulate as the resin particle. Alternatively, the resin particulate available on the market can be used. These resin particles can be used alone or in combination.

Also, non-aqueous emulsion polymer particles can also be used as the resin. The non-aqueous emulsion polymer particles means liquid dispersions in which particles of polyurethane resin, acrylic resin, acrylic polyol resin, etc., are stably dispersed in an organic solvent.

Specific examples of the polyurethane resin include, but are not limited to, "Samprene IB-501" and "Samprene IB-F370", manufactured by Sanyo Chemical Industries, Ltd.

Specific examples of the acrylic polyol resin include, but are not limited to, "N-2043-60MEX" and "N-2043-AF-1", manufactured by Harima Chemicals Group, Inc.

The proportion of the resin in the non-aqueous clear ink is preferably from 9 percent by mass or more and more preferably from 9 to 25 percent by mass. When the resin proportion is 9 percent by mass or more, low gloss and high gloss can be controlled with a small amount of clear ink. When the proportion of the resin exceeds 25 percent by mass, the discharging stability of the ink may be lowered.

Low gloss is demonstrated by forming isolated dots having high dot ball height (pile height) to impart roughness to the surface.

When the proportion of the resin in the clear ink is large, dots having a high pile height are easily formed, which is preferable in terms of imparting low gloss.

Conversely, high gloss is obtained by filling surface irregularities with clear ink, thereby forming a smooth surface. In order to fill the surface irregularities with the clear ink, it is preferable that the proportion of the resin in the clear ink be large because the surface irregularities can be filled with a small amount of clear ink, thereby easily imparting high gloss.

Organic Solvent

Specific examples of the organic solvent include, but are not limited to, polar organic solvents such as alcohols (e.g., methyl alcohol, ethyl alcohol, propyl alcohol, butyl alcohol, isopropyl alcohol, and fluorinated alcohol), ketones (e.g., acetone, methylethyl ketone, and cyclohexanone), carboxylic acid esters (e.g., methyl acetate, ethyl acetate, propyl acetate, butyl acetate, methyl propionate, and ethyl propionate,), and ethers (e.g., diethyl ether, dipropyl ether, alkylene glycol ether compounds, tetrahydrofuran, and dioxane). These can be used alone or in combination.

Of these, it is preferable to contain as the organic solvent one or more kinds of alkylene glycol ether compounds which are liquid at normal temperature and normal pressure.

As the alkylene glycol ether compound, an alkylene glycol alkyl ether compound can be suitably used.

Specific examples of the alkylene glycol alkyl ether compounds include, but are not limited to, ethylene glycol alkyl ether and propylene glycol alkyl ether. The alkyl includes a chain alkyl group or a cyclic alkyl group.

Specific examples of the chain alkyl group include, but are not limited to, aliphatics compounds and allyl having a double bond of methyl, n-propyl, i-propyl, n-butyl, i-butyl, and hexyl. An example of the cyclic alkyl is a phenyl group. These compounds are colorless with little odor and has an ether group and a hydroxyl group in its molecule. Therefore, they are liquid at normal temperature with properties of both alcohol and ether. Also, there are a monoether type in which only one hydroxyl group is substituted and a diether type in which both hydroxyl groups are substituted, and a plurality of these can be used in combination.

In particular, the organic solvent preferably includes at least one member selected from an alkylene glycol diether compound, an alkylene glycol monoether compound, and a lactone compound.

Specific examples of the alkylene glycol monoether compound include, but are not limited to, ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether. These can be used alone or in combination.

Specific examples of the alkylene glycol diether compound include, but are not limited to, ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether. These can be used alone or in combination.

Specific examples of the lactone compounds include, but are not limited to, γ-butyrolactone, δ-valerolactone, and ε-Caprolactone Specific examples of the other non-aqueous solvents include, but are not limited to, lactic acid ester, propylene glycol monomethyl ether acetate (PMA), 2-butoxyethyl acetate (BMGAC), propylene diglycol acetate (PGDA), dipropylene glycol dimethyl ether (DMM), 3-methoxy-n-butyl-aetate (MBA), 1-butoxy-2-propanol (PNB), and 2-octanone.

The proportion of the organic solvent in the non-aqueous clear ink has no particular limit and can be suitably selected to suit to a particular application.

In terms of drying property and discharging reliability of ink, the proportion is preferably from 10 to 60 percent by mass and more preferably from 20 to 60 percent by mass.

Surfactant

The non-aqueous clear ink preferably contains a surfactant.

When a surfactant is added to the ink, the surface tension is lowered and the ink droplets quickly permeate a recording medium after the ink droplets have landed thereon, so that feathering and color bleed are reduced.

Surfactants are classified into nonionicity, anionicity, and amphotericity according to the polarity of the hydrophilic group.

Moreover, it is classified into a fluorine type, a silicone type, an acetylene type, etc., according to the structure of a hydrophobic group.

In the present disclosure, a fluorine-based surfactant is mainly used, but a silicone-based surfactant or an acetylene-based surfactant may be used in combination.

The proportion of the surfactant is preferably not greater than 2.00 percent by mass, more preferably from 0.05 to 2.00 percent by mass, and furthermore preferably from 0.10 to 2.00 percent by mass. When the proportion of the surfactant is 2.00 percent by mass or less, a large reduction in gloss can be obtained in the low gloss printing mode.

As the surfactant, it is possible to use any of silicone-based surfactants, fluorochemical surfactants, amphoteric surfactants, nonionic surfactants, or anionic surfactants.

The silicone-based surfactant has no particular limit and can be suitably selected to suit to a particular application. Of these, preferred are silicone-based surfactants which are not decomposed even in a high pH environment. Examples are side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluoro-surfactants are, for example, Li, Ha, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Toray Co., Ltd., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane;

Chemical formula S-1

In Chemical formula S-1, "m", "a", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, Z-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc).

A fluorochemical surfactant in which the number of carbon atoms replaced with fluorine atoms is 2 to 16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in the side chain thereof are preferable because these polymer compounds do not easily foam and the fluorosurfactant represented by the following Chemical formula F-1 or Chemical formula F-2 is more preferable.

Chemical formula F-1 in the compound represented by Chemical formula F-1, m is preferably 0 or an integer of from 1 to 10 and a is preferably 0 or an integer of from 1 to 40.

Chemical formula F-2

In the compound represented by the chemical formula F-2, Y represents H or $C_mF_{2m+1}$, where m represents an integer of from 1 to 6, or $CH_2CH(OH)CH_2$—$C_mF_{2m+1}$, where m represents an integer of from 4 to 6, or $C_pH_{2p+1}$, where p is an integer of from 1 to 19, "n" represents an integer of from 1 to 6. "a" represents an integer of from 4 to 14.

As the fluorochemical surfactant, products available on the market may be used.

Specific examples of the products available on the market include, but are not limited to, SURFLON S-111, SURFLON 5-112, SURFLON 5-113, SURFLON 5-121, SURFLON 5-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL™ TBS, FSP, FSA, FSN-100, FSN, FSO-100, FSO, FS-300, UR, CAPSTONE® FS-30, FS-31, FS-3100, FS-34, FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, PF-159 (manufactured by OMNOVA SOLUTIONS INC.), and UNIDYNE DSN-403N (manufactured by DAIKIN INDUSTRIES). Of these, FS-3100, FS-34, and FS-300 (manufactured by The Chemours Company), FT-110, FT-250, FT-251, FT-400S, FT-150, and FT-400SW (manufactured by NEOS COMPANY LIMITED), PolyFox PF-151N (manufactured by OMNOVA SOLUTIONS INC.), and UNIDYNE DSN-403N (manufactured by DAIKIN INDUSTRIES) are particularly preferable in terms of good printing quality, in particular coloring, and improvement on permeation to paper, wettability, and uniform dying property.

The non-aqueous clear ink may furthermore optionally contain, for example, a defoaming agent, a preservatives and fungicides, a corrosion inhibitor, and a pH regulator.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to not lower than 7. Specific examples include, but are not limited to, amines such as diethanol amine and triethanol amine.

Properties of the non-aqueous clear ink are not particularly limited and can be suitably selected to suit to a particular application. For example, viscosity, surface tension, pH, etc., are preferable if those are in the following ranges.

Viscosity of the non-aqueous clear ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Rotational frequency: 50 rotations per minute (rpm)
25 degrees C.
Measuring time: three minutes The surface tension of the non-aqueous clear ink is preferably 35 mN/m or less and more preferably 32 mN/m or less at 25 degrees C. in terms that the ink is suitably leveled on a recording medium and the drying time of the ink is shortened.

The pH of the non-aqueous clear ink is preferably from 7 to 12 and more preferably from 8 to 11 in terms of prevention of corrosion of metal materials in contact with the white ink.

Substrate

The substrate is not limited to articles used as a recording medium. For example, it is suitable to use building materials such as wall paper, floor material, and tiles, cloth for apparel such as T-shirts, textile, and leather. In addition, the configuration of the paths through which the recording medium is conveyed can be adjusted to use ceramics, glass, metal, etc., as the substrate.

The recording medium is not particularly limited. Plain paper, high gloss paper, special paper, cloth, etc. are usable. Also, good images can be formed on a non-permeable substrate.

The non-permeable substrate has a surface with low moisture permeability and low absorbency and includes a material having myriad of hollow spaces inside but not open to the outside. To be more quantitative, the substrate has a water-absorption amount of 10 mL/m$^2$ or less between the start of the contact and 30 msec$^{1/2}$ later according to Bristow method.

For example, plastic films such as vinyl chloride resin film, polyethylene terephthalate (PET) film, acrylic resin film, polypropylene film, polyethylene film, and polycarbonate film are suitably used as the non-permeable substrate.

The substrate is not particularly limited and the same substrate can be used both in the high gloss printing mode and the low gloss printing mode. In the present disclosure, in the low gloss printing mode, using a substrate demonstrating a high gloss is preferable. Substrates demonstrating a high gloss easily emphasize matte effect by clear ink, which is preferable.

In the high gloss printing mode, using a substrate demonstrating a low gloss is preferable. Substrates demonstrating a low gloss easily emphasize gloss effect by clear ink, which is preferable.

Therefore, when the degree of gloss of the substrate to be used in the low gloss printing mode is Glow and the degree of gloss of the substrate to be used in the high gloss printing mode is Ghigh, the following relationship is satisfied: Glow>Ghigh, and preferably Glow−Ghigh≥100.

Method of Controlling Degree of Gloss of Printed Image

The degree of gloss of a printed image is controlled by the method of controlling the degree of gloss of a printed image of printed matter including discharging a non-aqueous clear ink containing a resin and an organic solvent to a substrate to form a printing layer thereon to form the printed matter and heating the substrate. The method has a low gloss printing mode to impart low gloss to the printed image and a high gloss printing mode to impart high gloss to the printed image. The heating temperature is controlled to be set high to print in the low gloss printing mode and to be set low to print in the high gloss printing mode.

Printed Matter

The printed matter of the present disclosure has a substrate and a printing layer on the substrate. The printing layer includes a clear ink layer containing a resin and the printed matter is a low gloss printed image printed in a low gloss printing mode and a high gloss printed image printed in a high gloss printing mode. In addition, the difference of the degree of gloss between 60° glossiness Ga of the printed image printed in the high gloss printing mode and 60° glossiness Gb of the substrate used in the high gloss printing mode, which is Ga−Gb, is 20 or more and the difference of the degree of gloss between 60° glossiness Gc of the printed image printed in the low gloss printing mode and 60° glossiness Gd of the substrate used in the low gloss printing mode, which is Gc−Gd, is −20 or less.

The printed matter is formed by forming an image by an inkjet recording device and an inkjet printing method.

Recording Device and Recording Method

Hereinafter, an example in which black (K), cyan (C), magenta (M), and yellow (Y) are used in the description of the following recording device and the following recording method. It is possible to use the non-aqueous clear ink in place of or in addition to those inks.

The non-aqueous clear ink for use in the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In addition, the inkjet recording device includes both a serial type device in which the discharging head is allowed to move and a line type device in which the liquid discharging head is not moved, unless otherwise specified.

Furthermore, in addition to the desktop type, this inkjet recording device includes a device capable of printing images on a wide recording medium and a continuous printer capable of using continuous paper rolled up in a roll-like form as a recording medium.

In the present disclosure, the recording device and the recording method respectively represent a device capable of discharging ink, various processing liquids, etc., to a recording medium and a method of recording utilizing the device.

The recording medium means an article to which ink or various processing fluids can be temporarily or permanently attached.

The recording device may further optionally include a device relating to feeding, conveying, and ejecting a recording medium and other devices referred to as a pre-processing device, a post-processing device, etc., in addition to the head portion to discharge the ink.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as AO and a continuous printer capable of using continuous paper rolled up in a roll-like form as a recording medium.

Figure 1:
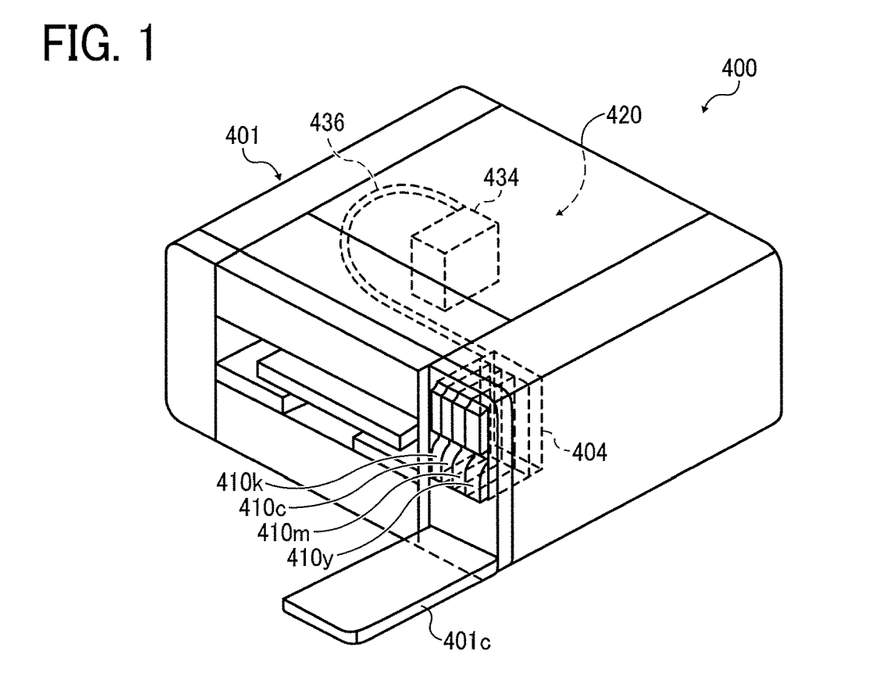
FIG. 1 is a schematic diagram illustrating an example of the image forming device executing the inkjet printing method according to an embodiment of the present invention.
Figure 2:
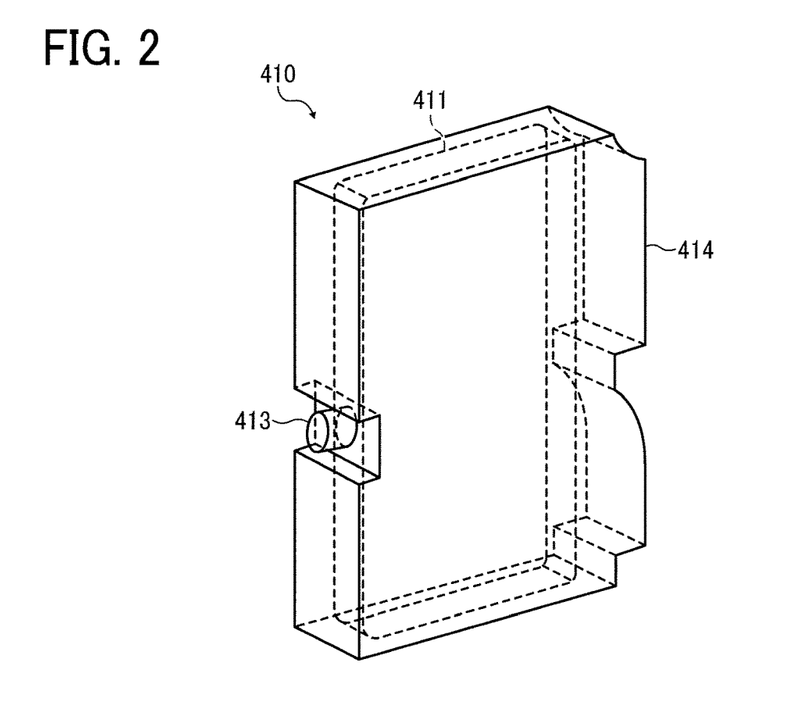
FIG. 2 is a diagram illustrating a perspective view of an example of the main tank of the image forming device illustrated in FIG. 1.

The recording device is described using an example with reference to FIG. 1 and FIG. 2. FIG. 1 is a diagram illustrating a perspective view of the recording device. FIG. 2 is a diagram illustrating a perspective view of the main tank. An image forming device 400 as an embodiment of the recording device is a serial type image forming device. A mechanical assembly 420 is disposed in an exterior 401 of the image forming device 400. Each ink accommodating unit 411 of each main tank 410 (410k, 410c, 410m, and 410y) for each color of black (K), cyan (C), magenta (M), and yellow (Y) is made of, for example, a packaging member such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401c is opened. The main tank 410 is detachably attached to the cartridge holder 404. This enables each ink outlet 413 of the main tank 410 to communicate with a discharging head 434 for each color via a supplying tube 436 for each color so as to discharge the ink from the discharging head 434 to a recording medium.

This recording device may include not only a portion to discharge ink but also devices referred to as a pre-processing device, a post-processing device, etc.

As an example of the pre-processing device and the post-processing device, like black (K), cyan (C), magenta (M), and yellow (Y) ink as in the case of the ink, the pre-processing device and the post-processing device may further include a liquid accommodating unit including a pre-processing fluid or a post-processing fluid and a liquid discharging head to discharge the pre-processing fluid or the post-processing fluid according to an inkjet printing method.

As another example of the pre-processing device and the post-processing device, it is suitable to dispose a pre-processing device and a post-processing device which do not employ the inkjet printing method but a blade coating method, a roll coating method, or a spray coating method.

Figure 3:
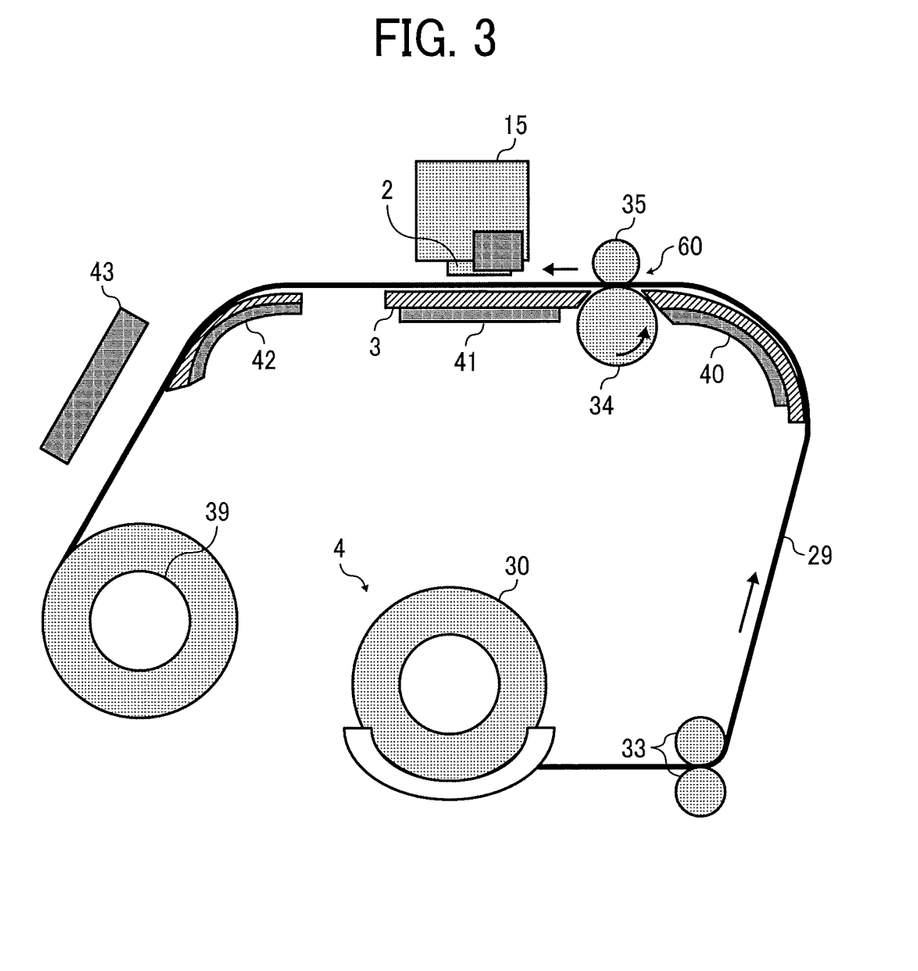
FIG. 3 is a diagram illustrating the inside of an inkjet printing device.

FIG. 3 is a diagram illustrating the inside of an inkjet printing device, which includes a recording head 2, a platen 3, a roll media storage unit 4, and heating devices, etc.

A carriage 15 carries a recording head as a discharging device to discharge ink droplets that includes clear ink and other optional color inks such as black (K), yellow (Y), magenta (M), and cyan (C).

In addition, the roll medium accommodating unit 4 is a medium feeding device where a roll medium (recording medium) 30 as the substrate is set.

A conveying device 60 is formed of a conveying roller 34 and a pressing roller 35 which face each other while sandwiching the platen 3 from top and bottom.

While a recording medium (substrate) 29 is nipped between the conveying roller 34 and the pressing roller 35, the conveying roller 34 is rotated in the direction indicated by the arrow to convey forward the recording medium 29 conveyed onto the platen 3.

In addition, there are provided a pre-heater 40 that preliminarily heats the recording medium 29, which is disposed upstream of the platen 3 in the recording medium conveying direction and a print heater 41 as the heating device that conducts heating when the clear ink is discharged from the recording head and attached onto the substrate.

Furthermore, on the upstream side of the recording head, a post heater 42 may be provided downstream of the platen 3. Because of the post heater 42, the recording medium 29 can be sequentially heated to promote drying of the landed ink droplets, which is preferable.

The pre-heater 40, the print heater 41, and the post heater 42 use conduction heating heater using ceramic or nichrome wire, etc.

Moreover, a hot air fun 43 is provided downstream of the starting point of the post heater 42 and blow the heated air to the recorded surface of the recording medium 29 on which the ink droplets have landed. Heated air is directly blown to the ink on the recorded surface by the hot air fun 43 so that the ink is completely dried. Thereafter the recording medium 29 is rolled up by a roll-up roller 39.

How to use the ink is not limited to the inkjet recording method. Specific examples of such methods other than the inkjet recording method include, but are not limited to, blade coating methods, gravure coating methods, bar coating methods, roll coating methods, dip coating methods, curtain coating methods, slide coating methods, die coating methods, and spray coating methods.

The usage of the ink is not particularly limited and can be suitably selected to suit to a particular application. For example, the ink can be used for printed matter, a paint, a coating material, and foundation. The ink can be used to form two-dimensional texts and images and furthermore a three-dimensional solid object (solid fabrication object or solid freeform fabrication object) as a material for 3D modeling.

The solid fabrication apparatus to fabricate a solid fabrication object can be any known device with no particular limit. For example, the apparatus includes a container, a supplying device, and a discharging device, a drier, etc., of ink. The solid fabrication object includes an object manufactured by repeated ink coating. In addition, the solid fabrication object includes a molded processed product manufactured by processing a structure having a substrate such as a recording medium to which the ink is applied. The molded processed product is manufactured from recorded low gloss or a structure having a sheet-like form, film-like form, etc. by, for example, heating drawing or punching. The molded processed product is suitably used for articles which are molded after surface-decorating. Examples are gauges or operation panels of vehicles, office machines, electric and electronic devices, cameras, etc.

Image forming, recording, printing, print, etc. in the present disclosure represent the same meaning.

Also, recording media, media, substrates in the present disclosure have the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Manufacturing Example 1

Manufacturing of Non-aqueous Clear Ink A 19.5 percent by mass of commercially available urethane resin liquid (Sanprene IB-F370, non-volatile content of 40 percent by mass, non-aqueous, solvent: solvent mixture of methoxypropanol and isopropanol, manufactured by Sanyo Chemical Industries, Ltd.), 55 percent by mass of diethylene glycol diethyl ether, 13.1 percent by mass of γ-butyrolactone, 10.0 percent by mass of tetraethylene glycol dimethyl ether, 0.6 percent by mass of silicone-based surfactant (BYK-UV 3500, manufactured by BYK Chemie GmbH), and 1.8 percent by mass of acetylene glycol-based surfactant (E-1010, manufactured by Nisshin Chemical Industry Co., Ltd.) was admixed and stirred to prepare a mixture.

Subsequently, the thus-obtained mixture was filtrated with a polypropylene filter (Betafine polypropylene pleat filter PPG series, manufactured by 3M company) with an average pore diameter of 0.2 micrometer to obtain non-aqueous clear ink A.

Examples 2 to 5

Manufacturing of Non-Aqueous Clear Inks B to E

Non-aqueous clear inks B to E were manufactured in the same manner as in Manufacturing Example 1 except that the ink composition was changed as shown in Table 1.

TABLE 1

| | | Manufacturing Example 1 Non-aqueous clear ink A | Manufacturing Example 2 Non-aqueous clear ink B | Manufacturing Example 3 Non-aqueous clear ink C | Manufacturing Example 4 Non-aqueous clear ink D | Manufacturing Example 5 Non-aqueous clear ink E |
|---|---|---|---|---|---|---|
| Resin | Urethane resin (Samprene 1B-F370) | 19.5 | 22.5 | 22.5 | 35 | — |
| | Acrylic resin (N-2043-60MEX) | — | — | — | — | 23.3 |
| Organic solvent | Diethylene glycol diethylether | 55 | 52 | 52.4 | 40 | 52 |
| | γ-butyrolactone | 13.1 | 13.1 | 13.5 | 13.4 | 13.1 |
| | Tetraethylene glycol dimethylether | 10 | 10 | 10 | 10 | — |
| | Propylene glycol monomethylether acetate | — | — | — | — | 10 |
| Surfactant | Silicone-based surfactant (BYK-UV3500) | 0.6 | 0.6 | 0.4 | 0.4 | 0.4 |
| | Acetylene glycol-based surfactant (E-1010) | 1.8 | 1.8 | 1.2 | 1.2 | 1.2 |
| | Total (Percent by mass) | 100 | 100 | 100 | 100 | 100 |
| | Solid content of resin in non-aqueous clear ink (% by mass) | 7.8 | 9 | 9 | 14 | 14 |

The details of the individual ingredients in Table 1 are as follows:

Urethane resin liquid (Sanprene IB-F370, non-volatile content of 40 percent by mass, non-aqueous, solvent, solvent: solvent mixture of methoxypropanol and isopropanol, manufactured by Sanyo Chemical Industries, Ltd.,)

Acrylic resin liquid (N-2043-60MEX, non-volatile content of 60 percent by mass, manufactured by Harima Chemicals Industries Ltd.)

Silicone-based surfactant (BYK-UV3500, manufactured by BYK Chemie GmbH)

Acetylene glycol-based surfactant (E-1010, manufactured by Nisshin Chemical co., ltd.)

Manufacturing Example 6

Manufacturing of Magenta Ink

As shown in Table 2 below, 3 parts by mass of a magenta pigment (Pigment Red 122, toner magenta E002, manufactured by Clariant Japan Co., Ltd.), 0.5 parts by mass of a dispersant (polyester-based compound), and 58.5 parts of diethylene glycol diethyl ether were premixed. Thereafter, the mixture was subjected to circulating dispersion for 3 hours with a disk type bead mill (KDL type, media: zirconia balls having a diameter of 0.3 mm, manufactured by Shinmaru Enterprises Corporation) to obtain a magenta pigment dispersion.

Next, 62 parts by mass of the thus-obtained magenta pigment dispersion, 12.5 parts by mass of urethane resin (Sanprene IB-F370, manufactured by Sanyo Chemical Industries, Ltd.), 13.1 parts by mass of γ-butyrolactone, 10 parts of tetraethylene glycol dimethylether, 0.6 parts by mass of silicone-based surfactant (BYK-UV 3500), and 1.8 parts by mass of acetylene glycol surfactant (E-1010) were mixed and stirred to prepare a mixture.

The thus-obtained mixture was filtrated with a polypropylene filter (Betafine polypropylene pleat filter PPG series, manufactured by 3M company) with an average pore diameter of 0.2 micrometer to obtain a magenta ink.

TABLE 2

|  |  | Magenta ink |
|---|---|---|
| Pigment | Pigment red 122 (Toner Magenta EO02) | 3 |
| Dispersant | Polyester-based Compound | 0.5 |
| Resin | Urethane resin Sanprene IB-F370, manufactured by Sanyo Chemical Industries, Ltd. (non-volatile content of 40 percent by mass, solvent PGM/IPA) | 12.5 |
| Organic solvent | Diethylene glycol diethylether | 58.5 |
|  | γ-butyrolactone | 13.1 |
|  | Tetraethylene glycol dimethylether | 10 |
| Surfactant | Silicone-based surfactant (BYK-UV3500) | 0.6 |
|  | Acetylene glycol-based surfactant (E-1010) | 1.8 |
| Total (parts) |  | 100 |

Example 1

Inkjet Printing

An ink cartridge of an inkjet printer (GXe5500 remodeled machine, manufactured by Ricoh Co., Ltd.) was filled with the non-aqueous clear ink A of Manufacturing Example 1. Thereafter, the ink cartridge filled with the ink was mounted to the inkjet printer GXe5500 remodeled machine followed by inkjet printing.

The inkjet printer GXe 5500 remodeled machine was provided with a heater (temperature control controller, model MTCD, available from MIS UMI, Inc.) so that the recording medium could be heated from the back side before printing, during printing, and after printing. This enabled printing on the recording medium heated by the heater before printing and during printing, and enabled the heater to heat and dry the printed matter after printing.

Printing was conducted while changing the type of recording media, heating conditions, and printing images depending on the high gloss printing mode and the low gloss printing mode.

Recording Medium

In the high gloss printing mode, synthetic paper VJFN160 (white polypropylene film, gloss 16 (60° gloss value), manufactured by Yupo Corporation) was used as the recording medium 1.

In the low gloss printing mode, a window film GIY-0305 (transparent polyethylene terephthalate (PET) film, gloss 159 (60° gloss value), manufactured by Lintec Corporation) was used as the recording medium 2.

Heating Condition

In the high gloss printing mode, the heating temperatures of each heater (heating device) disposed before printing, during printing, and after printing were set at 45 degrees C., 45 degrees C., and 60 degrees C. In the low gloss printing mode, the heating temperature of each heater (heating device) was set at 60 degrees C., 60 degrees C., and 60 degrees C. When measuring the temperature of the recording medium during printing, the recording medium temperature (Thigh) in the high gloss printing mode was 45 degrees C., and the temperature (HThigh) of the heating device during printing in the high gloss printing mode was 45 degrees C. When measuring the temperature of the recording medium during printing, the recording medium temperature (Tlow) in the low gloss printing mode was 59 degrees C., and the temperature (HTlow) of the heating device during printing in the low gloss printing mode was 60 degrees C.

The temperature of the recording medium during printing was measured with a digital radiation temperature sensor (FT-H10, manufactured by Keyence Corporation).

The image printed in the high gloss printing mode was a solid image having an image resolution of 600 dpi×600 dpi with a printing ratio of 100 percent.

The image printed in the low gloss printing mode was a half-tone image having an image resolution of 600 dpi×600 dpi with a printing ratio of 40 percent.

Printing Ratio

The printing ratio means the following:

Print ratio (percent)=number of clear ink printing dots/(vertical resolution×horizontal resolution)×100

In the above formula, "the number of clear ink printing dots" means the number of dots actually printed with clear ink per unit area, and "vertical resolution" and "horizontal resolution" are resolutions per unit area. When clear ink is disposed at the same dot position in an overlapping manner for printing, "the number of clear ink printing dots" represents the total number of dots per unit area actually used for printing with clear ink.

In both the low gloss printing mode and the high gloss printing mode, the non-aqueous clear ink A was printed on the recording medium by single-overcoating directly on the same dot position in an overlapping manner.

The degree of gloss of the thus-obtained printed matter was measured in the following manner. The results are shown in Table 4.

Degree of Gloss

The 60° gloss value of each of the clear ink printed portion on which the non-aqueous clear ink A was printed and the clear ink unprinted portion (recording medium) on which the non-aqueous clear ink A was not printed was measured by a gloss meter (micro-Tri-gloss, manufactured by BYK-Chemie GmbH). The 60° gloss value was determined as the gloss level.

Example 2

Inkjet printing was conducted in the same manner as in Example 1 except that the image printed in the high gloss printing mode was changed to a halftone image having an image resolution of 600 dpi×600 dpi with a printing ratio of 80 percent and the image printed in the low gloss printing mode was changed to a halftone image having an image resolution of 600 dpi×600 dpi with a printing ratio of 70 percent.

The degree of gloss of the thus-obtained printed matter was measured in the same manner as in Example 1. The results are shown in Table 4.

Example 3

Inkjet printing was conducted in the same manner as in Example 1 except that the heating conditions were set at 40 degrees C., 40 degrees C., and 60 degrees C. for the heating temperatures of each heater before printing, during printing, and after printing in the high gloss printing mode and the heating conditions were set at 65 degrees C., 65 degrees C., and 65 degrees C. for the heating temperatures of each heater before printing, during printing, and after printing in the low gloss printing mode.

The degree of gloss of the thus-obtained printed matter was measured in the same manner as in Example 1. The results are shown in Table 4.

When measuring the temperature of the recording medium during printing, the recording medium temperature (Thigh) in the high gloss printing mode was 40 degrees C., and the temperature (HThigh) of the heating device during printing in the high gloss printing mode was 40 degrees C. When measuring the temperature of the recording medium during printing, the recording medium temperature (Tlow) in the low gloss printing mode was 64 degrees C., and the temperature (HTlow) of the heating device during printing in the low gloss printing mode was 65 degrees C.

Example 4

Inkjet printing was conducted in the same manner as in Example 3 except that the non-aqueous clear ink A of Manufacturing Example 1 was changed to the non-aqueous clear ink B of Manufacturing Example 2.

The degree of gloss of the thus-obtained printed matter was measured in the same manner as in Example 1. The results are shown in Table 4.

Example 5

Inkjet printing was conducted in the same manner as in Example 3 except that the non-aqueous clear ink A of Manufacturing Example 1 was changed to the non-aqueous clear ink C of Manufacturing Example 3.

The degree of gloss of the thus-obtained printed matter was measured in the same manner as in Example 1. The results are shown in Table 4.

Example 6

Inkjet printing was conducted in the same manner as in Example 3 except that the non-aqueous clear ink A of Manufacturing Example 1 was changed to the non-aqueous clear ink D of Manufacturing Example 4.

The degree of gloss of the thus-obtained printed matter was measured in the same manner as in Example 1. The results are shown in Table 4.

Example 7

Inkjet printing was conducted in the same manner as in Example 3 except that the non-aqueous clear ink A of Manufacturing Example 1 was changed to the non-aqueous clear ink E of Manufacturing Example 5.

The degree of gloss of the thus-obtained printed matter was measured in the same manner as in Example 1. The results are shown in Table 4.

Comparative Example 1

Inkjet printing was conducted in the same manner as in Example 2 except that the heater temperature in the high gloss printing mode was set at 50 degrees C., 50 degrees C., and 60 degrees C., which were the same as the heater temperature in the low gloss printing mode.

The degree of gloss of the thus-obtained printed matter was measured in the same manner as in Example 1. The results are shown in Table 4.

When measuring the temperature of the recording medium during printing, the recording medium temperature (Thigh) in the high gloss printing mode was 49 degrees C., and the temperature (HThigh) of the heating device during printing in the high gloss printing mode was 50 degrees C. When measuring the temperature of the recording medium during printing, the recording medium temperature (Thigh) in the low gloss printing mode was 49 degrees C., and the temperature (Hlow) of the heating device during printing in the low gloss printing mode was 50 degrees C.

Comparative Example 2

Inkjet printing was conducted in the same manner as in Example 1 except that the heater temperature in the high gloss printing mode was set at 60 degrees C., 60 degrees C., and 60 degrees C., which were the same as the heater temperature in the low gloss printing mode.

The degree of gloss of the thus-obtained printed matter was measured in the same manner as in Example 1. The results are shown in Table 4.

When measuring the temperature of the recording medium during printing, the recording medium temperature (Thigh) in the high gloss printing mode was 59 degrees C., and the temperature (HThigh) of the heating device during printing in the high gloss printing mode was 60 degrees C. When measuring the temperature of the recording medium during printing, the recording medium temperature (Tlow) in the low gloss printing mode was 59 degrees C., and the temperature (HTlow) of the heating device during printing in the low gloss printing mode was 60 degrees C.

Comparative Example 3

The same printing machine as in Example 1 was filled with the magenta ink of Manufacturing Example 6 and only the magenta ink was printed on the recording medium to form magenta ink film in the high gloss printing mode at the heating temperature of each heater of 45 degrees C. before printing, 45 degrees C. during printing, and 60 degrees C. after printing and magenta ink film in the low gloss printing mode at the heating temperature of each heater of 60 degrees C. before printing, 60 degrees C. during printing, and 60 degrees C. after printing. The magenta print image was a solid image printed with an image resolution of 600 dpi×600 dpi with a print ratio of 100 percent.

The degree of gloss of the thus-obtained printed matter was measured in the same manner as in Example 1. The results are shown in Table 4.

Comparative Example 4

Inkjet printing was conducted in the same manner as in Comparative Example 2 except that the heater temperatures in the low gloss printing mode were set at 50 degrees C., 50 degrees C., and 60 degrees C.

The degree of gloss of the thus-obtained printed matter was measured in the same manner as in Example 1. The results are shown in Table 4.

TABLE 3

| | Printing condition | | | | |
|---|---|---|---|---|---|
| | Kind of ink | Print mode | Recording medium | Printed image | Printing ratio |
| Example 1 | Non-aqueous clear ink A | High gloss | VJFN 160 | Solid image | 100% |
| | | Low gloss | GIY0305 | Halftone image | 40% |
| Example 2 | Non-aqueous clear ink A | High gloss | VJFN 160 | Halftone image | 80% |
| | | Low gloss | GIY0305 | Halftone image | 70% |
| Example 3 | Non-aqueous clear ink A | High gloss | VJFN 160 | Solid image | 100% |
| | | Low gloss | GIY0305 | Halftone image | 40% |
| Example 4 | Non-aqueous clear ink B | High gloss | VJFN 160 | Solid image | 100% |
| | | Low gloss | GIY0305 | Halftone image | 40% |
| Example 5 | Non-aqueous clear ink C | High gloss | VJFN 160 | Solid image | 100% |
| | | Low gloss | GIY0305 | Halftone image | 40% |
| Example 6 | Non-aqueous clear ink D | High gloss | VJFN 160 | Solid image | 100% |
| | | Low gloss | GIY0305 | Halftone image | 40% |
| Example 7 | Non-aqueous clear ink E | High gloss | VJFN 160 | Solid image | 100% |
| | | Low gloss | GIY0305 | Halftone image | 40% |
| Comparative Example 1 | Non-aqueous clear ink A | High gloss | VJFN 160 | Halftone image | 80% |
| | | Low gloss | GIY0305 | Halftone image | 70% |
| Comparative Example 2 | Non-aqueous clear ink A | High gloss | VJFN 160 | Solid image | 100% |
| | | Low gloss | GIY0305 | Halftone image | 40% |
| Comparative Example 3 | Magenta ink | High gloss | VJFN 160 | Solid image | 100% |
| | | Low gloss | GIY0305 | Solid image | 100% |
| Comparative Example 4 | Non-aqueous clear ink A | High gloss | VJFN 160 | Solid image | 100% |
| | | Low gloss | GIY0305 | Halftone image | 40% |

| | Printing condition | | | |
|---|---|---|---|---|
| | | | Heater temperature | |
| | Printing ratio | Number of times of over-painting | Heater before printing | Heater during printing (HThigh, HTlow) | Heater after printing |
| Example 1 | 100% | Once | 45° C. | 45° C. | 60° C. |
| | 40% | Once | 60° C. | 60° C. | 60° C. |
| Example 2 | 80% | Once | 45° C. | 45° C. | 60° C. |
| | 70% | Once | 60° C. | 60° C. | 60° C. |
| Example 3 | 100% | Once | 40° C. | 40° C. | 60° C. |
| | 40% | Once | 65° C. | 65° C. | 65° C. |
| Example 4 | 100% | Once | 40° C. | 40° C. | 60° C. |
| | 40% | Once | 65° C. | 65° C. | 65° C. |
| Example 5 | 100% | Once | 40° C. | 40° C. | 60° C. |
| | 40% | Once | 65° C. | 65° C. | 65° C. |
| Example 6 | 100% | Once | 40° C. | 40° C. | 60° C. |
| | 40% | Once | 65° C. | 65° C. | 65° C. |

TABLE 3-continued

| Example 7 | 100% | Once | 40° C. | 40° C. | 60° C. |
|---|---|---|---|---|---|
| | 40% | Once | 65° C. | 65° C. | 65° C. |
| Comparative Example 1 | 80% | Once | 50° C. | 50° C. | 60° C. |
| | 70% | Once | 50° C. | 50° C. | 60° C. |
| Comparative Example 2 | 100% | Once | 60° C. | 60° C. | 60° C. |
| | 40% | Once | 60° C. | 60° C. | 60° C. |
| Comparative Example 3 | 100% | — | 45° C. | 45° C. | 60° C. |
| | 100% | — | 60° C. | 60° C. | 60° C. |
| Comparative Example 4 | 100% | Once | 60° C. | 60° C. | 60° C. |
| | 40% | Once | 50° C. | 50° C. | 60° C. |

TABLE 4

| | Evaluation result | | | |
|---|---|---|---|---|
| | | | Degree of gloss | Difference of degree of gloss |
| | Temperature of recording medium during printing | | Clear ink printed portion | Clear ink non-printed portion | Printed portion - non-printed portion |
| Example 1 | Thigh | 45° C. | 40 | 16 | 24 |
| | Tlow | 59° C. | 125 | 159 | −34 |
| Example 2 | Thigh | 45° C. | 35 | 16 | 19 |
| | Tlow | 59° C. | 135 | 159 | −24 |
| Example 3 | Thigh | 40° C. | 50 | 16 | 34 |
| | Tlow | 64° C. | 115 | 159 | −44 |
| Example 4 | Thigh | 40° C. | 55 | 16 | 39 |
| | Tlow | 64° C. | 110 | 159 | −49 |
| Example 5 | Thigh | 40° C. | 54 | 16 | 38 |
| | Tlow | 64° C. | 105 | 159 | −54 |
| Example 6 | Thigh | 40° C. | 60 | 16 | 44 |
| | Tlow | 64° C. | 95 | 159 | −64 |
| Example 7 | Thigh | 40° C. | 55 | 16 | 39 |
| | Tlow | 64° C. | 100 | 159 | −59 |
| Comparative Example 1 | Thigh | 49° C. | 20 | 16 | 4 |
| | Tlow | 49° C. | 145 | 159 | −14 |
| Comparative Example 2 | Thigh | 59° C. | 21 | 16 | 5 |
| | Tlow | 59° C. | 125 | 159 | −34 |
| Comparative Example 3 | Thigh | 45° C. | 23 | 16 | 7 |
| | Tlow | 59° C. | 130 | 159 | −29 |
| Comparative Example 4 | Thigh | 59° C. | 21 | 16 | 5 |
| | Tlow | 49° C. | 142 | 159 | −17 |

The degree of gloss of the printed portion of magenta ink was shown in Comparative Example 3.

As seen in the results shown in Tables 3 and 4, the gloss greatly decreased in the low gloss printing mode and the gloss greatly increased in the high gloss printing mode in Examples 1 to 7 that satisfied Tlow>Thigh (HTlow>HThigh) in comparison with Comparative Examples 1 and 2 satisfying Tlow=Thigh (HTlow=HThigh).

Also, when Example 1 and Example 2 are compared, a large gloss change occurred in Example 1, in which the printing ratio Dhigh—the printing ratio Dlow was 60 percent in comparison with Example 2, in which the printing ratio Dhigh—the printing ratio Dlow was 10 percent.

Moreover, as seen in the results of Example 3, Example 4, and Example 6, as the resin proportion in the non-aqueous clear ink increases, the gloss change in the clear ink printing becomes large, so that Examples 4 and 6, in which the resin proportion in the non-aqueous clear ink was 8 percent by mass or more demonstrated a larger gloss change than Example 3, in which the resin proportion in the non-aqueous clear ink was less than 8 percent by mass.

Moreover, as seen in the results of Example 4 and Example 5, a large gloss change occurred in the low gloss printing mode in Example 5, in which the proportion of the surfactant was 2 percent by mass or less in comparison with Example 4, in which the proportion of the surfactant surpassed 2 percent by mass.

Aspects of the present disclosure are, for example, as follows.

1. An inkjet printing device for printing a substrate includes an ink container accommodating a non-aqueous clear ink containing a resin and an organic solvent, a discharging head configured to discharge the non-aqueous clear ink directly or indirectly onto a substrate to form printed matter; and a heating device configured to heat the substrate, wherein the following relationship is satisfied: Tlow (° C.)>Thigh (° C.), where Tlow (° C.) represents the temperature of the substrate that the heating device is heating during printing in a low gloss printing mode in which the non-aqueous clear ink is directly or indirectly discharged and attached to the substrate to impart low gloss to the printed matter and Thigh (° C.) represents the temperature of the substrate that the heating device is heating during printing in a high gloss printing mode in which the non-aqueous clear ink is directly or indirectly discharged and attached to the substrate to impart high gloss to the printed matter.

2. The inkjet printing device according to 1 mentioned above, wherein Tlow (° C.)−Thigh (° C.)≥10° C.

3. An inkjet printing device includes an ink container accommodating a non-aqueous clear ink containing a resin and an organic solvent, a discharging head configured to discharge the non-aqueous clear ink directly or indirectly onto a substrate to form printed matter, and a heating device configured to heat the printed matter, wherein the following relationship is satisfied: HTlow (° C.)>HThigh (° C.), where HTlow (° C.) represents the temperature of the heating device during printing in a low gloss printing mode to impart low gloss to the printed matter and HThigh (° C.) represents the temperature of the heating device in a high gloss during printing in a high gloss printing mode to impart high gloss to the printed matter.

4. The inkjet printing device according to any one of 1 to 3 mentioned above, wherein the following relationship is satisfied: Glow>Ghigh, where Glow represents the degree of gloss of a substrate for use in the low gloss printing mode and Ghigh represents the degree of gloss of a substrate for use in the high gloss printing mode.

5. The inkjet printing device according to any one of 1 to 4 mentioned above, wherein the proportion of the resin in the non-aqueous clear ink is 9 percent by mass or more.

6. The inkjet printing device according to any one of 1 to 5 mentioned above, wherein the resin includes a polyurethane resin.

7. The inkjet printing device according to any one of 1 to 6 mentioned above, wherein the organic solvent contains at least one member selected from the group consisting of an alkylene glycol diether compound, an alkylene glycol monoether compound, and a lactone compound.

8. The inkjet printing device according to any one of 1 to 7 mentioned above, wherein the non-aqueous clear ink further contains a surfactant and the proportion of the surfactant in the non-aqueous clear ink is 2 percent by mass or less.

9. The image forming device according to 8 mentioned above, wherein the surfactant includes at least either or both of a silicone-based surfactant and an acetylene glycol-based surfactant.

10. An inkjet printing method for printing on a substrate includes discharging a non-aqueous clear ink containing a resin and an organic solvent directly or indirectly onto a substrate to form printed matter and heating the substrate by a heating device, wherein the following relationship is satisfied: Tlow (° C.)>Thigh (° C.), where Tlow (° C.) represents the temperature of the substrate that the heating device is heating during printing in a low gloss printing mode in which the non-aqueous clear ink is directly or indirectly discharged and attached to the substrate to impart low gloss to the printed matter and Thigh (° C.) represents the temperature of the substrate that the heating device is heating during printing in a high gloss printing mode in which the non-aqueous clear ink is directly or indirectly discharged and attached to the substrate to impart high gloss to the printed matter.

11. The inkjet printing method according to 10 mentioned above, wherein Tlow (° C.)−Thigh (° C.)≥10° C.

12. An inkjet printing method includes discharging a non-aqueous clear ink containing a resin and an organic solvent directly or indirectly onto a substrate to form printed matter and heating the substrate by a heating device, wherein the following relationship is satisfied: HTlow gloss (° C.)>HThigh gloss (° C.), where HTlow (° C.) represents the temperature of the heating device during printing in a low gloss printing mode to impart low gloss to the printed matter and HThigh (° C.) represents the temperature of the heating device in a high gloss during printing in a high gloss printing mode to impart high gloss to the printed matter.

13. The inkjet printing method according to any one of 10 to 12 mentioned above, wherein the following relationship is satisfied: Glow>Ghigh, where Glow represents the degree of gloss of the substrate for use in the low gloss printing mode and Ghigh represents the degree of gloss of the substrate for use in the high gloss printing mode.

14. The inkjet printing method according to any one of 10 to 13 mentioned above, wherein the proportion of the resin in the non-aqueous clear ink is 9 percent by mass or more.

15. The inkjet printing method according to any one of 10 to 14 mentioned above, wherein the resin includes a polyurethane resin.

16. The inkjet printing method according to any one of 10 to 15 mentioned above, wherein the organic solvent contains at least one member selected from the group consisting of an alkylene glycol diether compound, an alkylene glycol monoether compound, and a lactone compound.

17. The inkjet printing method according to any one of 10 to 16 mentioned above, wherein the non-aqueous clear ink further contains a surfactant and the proportion of the surfactant in the non-aqueous clear ink is 2 percent by mass or less.

18. The inkjet printing method according to 17 mentioned above, wherein the surfactant includes at least either or both of a silicone-based surfactant and an acetylene glycol-based surfactant.

19. A method of controlling gloss of a printed image includes discharging a non-aqueous clear ink containing a resin and an organic solvent to a substrate to form the printed matter having a printing layer, heating the printed matter by a heating device, and raising a heating temperature of the printed image in a low gloss printing mode and lowering the heating temperature in a high gloss printing mode.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An inkjet printing device comprising:
an ink container accommodating a non-aqueous clear ink comprising a resin and an organic solvent;
a discharging head configured to discharge the non-aqueous clear ink directly or indirectly onto the substrate to form printed matter; and
a heating device configured to heat the substrate,
wherein the following relationship is satisfied:
Tlow (° C.)>Thigh (° C.), where Tlow (° C.) represents a temperature of the substrate that the heating device is heating during printing in a low gloss printing mode in which the non-aqueous clear ink is directly or indirectly discharged and attached to the substrate to impart low gloss to the printed matter and Thigh (° C.) represents a temperature of the substrate that the heating device is heating during printing in a high gloss printing mode in which the non-aqueous clear ink is directly or indirectly discharged and attached to the substrate to impart high gloss to the printed matter.

2. The inkjet printing device according to claim 1, wherein the heating device heats the substrate to satisfy the following relationship: Tlow (° C.)−Thigh (° C.)≥10° C.

3. The inkjet printing device according to claim 1, wherein the following relationship is satisfied: Glow>Ghigh, where Glow represents a degree of gloss of a substrate for use in the low gloss printing mode and Ghigh represents a degree of gloss of a substrate for use in the high gloss printing mode.

4. The inkjet printing device according to claim 1, wherein a proportion of the resin in the non-aqueous clear ink is 9 percent by mass or more.

5. The inkjet printing device according to claim 1, wherein the organic solvent comprises at least one member selected from the group consisting of an alkylene glycol diether compound, an alkylene glycol monoether compound, and a lactone compound.

6. The inkjet printing device according to claim 1, wherein the non-aqueous clear ink further comprises a surfactant and a proportion of the surfactant in the non-aqueous clear ink is 2 percent by mass or less.

7. An inkjet printing device comprising:
an ink container accommodating a non-aqueous clear ink comprising a resin and an organic solvent;
a discharging head configured to discharge the non-aqueous clear ink directly or indirectly onto the substrate to form printed matter; and
a heating device configured to heat the substrate,
wherein the following relationship is satisfied: HTlow (° C.)>HThigh (° C.), where HTlow (° C.) represents a temperature of the heating device during printing in a low gloss printing mode to impart low gloss to the printed matter and HThigh (° C.) represents a temperature of the heating device in a high gloss during printing in a high gloss printing mode to impart high gloss to the printed matter.

8. The inkjet printing device according to claim 7, wherein: HTlow (° C.)−HThigh (° C.)≥10° C.

9. The inkjet printing device according to claim 7, wherein the following relationship is satisfied: Glow>Ghigh, where Glow represents a degree of gloss of a substrate for use in the low gloss printing mode and Ghigh represents a degree of gloss of a substrate for use in the high gloss printing mode.

10. The inkjet printing device according to claim 7, wherein a proportion of the resin in the non-aqueous clear ink is 9 percent by mass or more.

11. The inkjet printing device according to claim 7, wherein the organic solvent comprises at least one member selected from the group consisting of an alkylene glycol diether compound, an alkylene glycol monoether compound, and a lactone compound.

12. The inkjet printing device according to claim 7, wherein the non-aqueous clear ink further comprises a surfactant and a proportion of the surfactant in the non-aqueous clear ink is 2 percent by mass or less.

13. An inkjet printing method comprising:
discharging a non-aqueous clear ink comprising a resin and an organic solvent directly or indirectly onto a substrate to form printed matter; and
heating the substrate by a heating device,
wherein the following relationship is satisfied: HTlow (° C.)>HThigh (° C.), where HTlow (° C.) represents a temperature of the heating device during printing in a low gloss printing mode to impart low gloss to the printed matter and HThigh (° C.) represents a temperature of the heating device in a high gloss during printing in a high gloss printing mode to impart high gloss to the printed matter.

* * * * *